March 8, 1927.
S. E. MORRISON
1,620,380
GRADOMETER
Filed Feb. 18, 1926
2 Sheets-Sheet 1
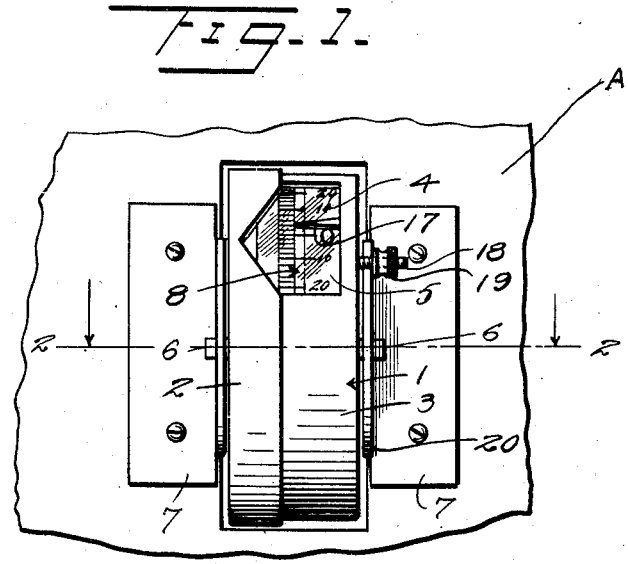
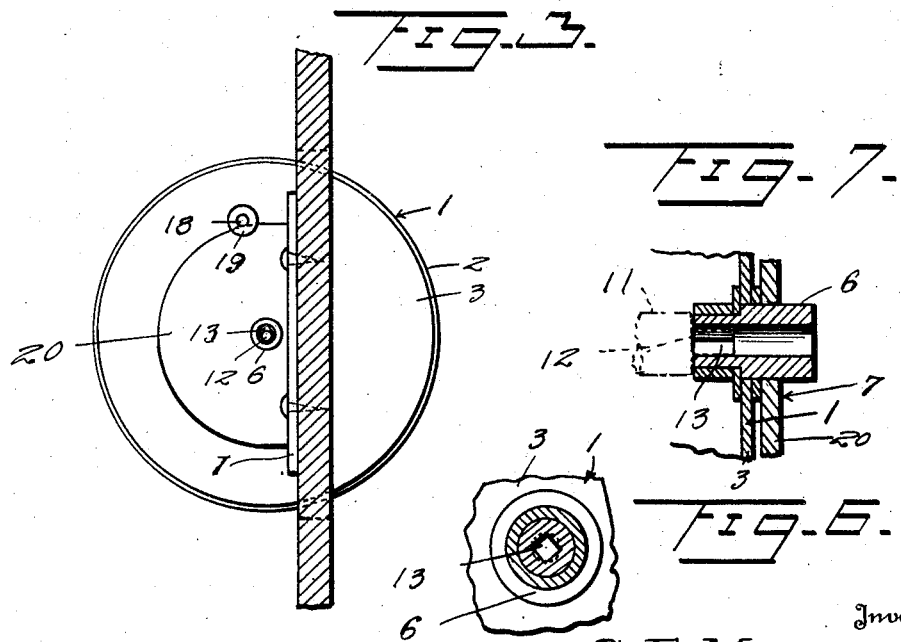
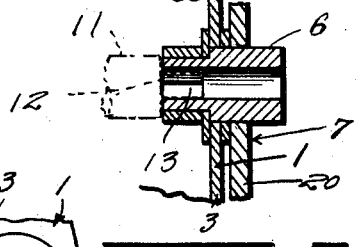
Inventor
S. E. Morrison.
By
Attorney March 8, 1927.
S. E. MORRISON
1,620,380
GRADOMETER
Filed Feb. 18, 1926
2 Sheets-Sheet 2
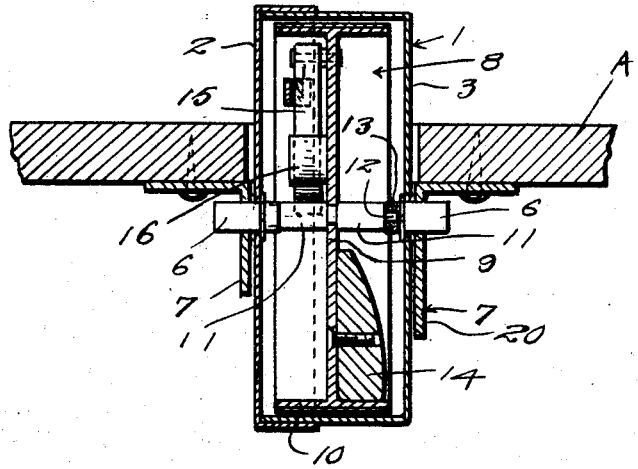
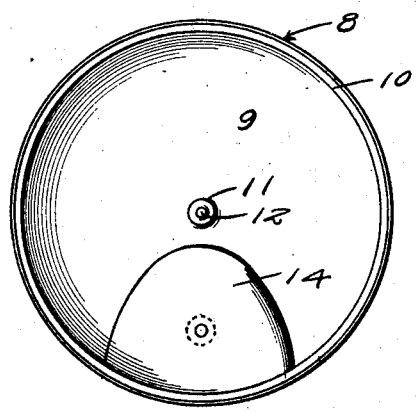
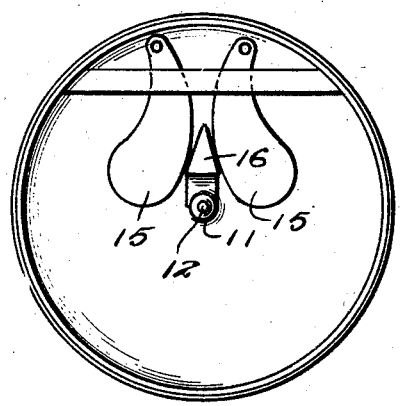
Inventor
S. E. Morrison Patented Mar. 8, 1927.

1,620,380

UNITED STATES PATENT OFFICE.

SAMUEL E. MORRISON, OF LYNN, MASSACHUSETTS.

GRADOMETER.

Application filed February 18, 1926. Serial No. 89,117.

The invention relates to mechanisms to be mounted on motor vehicles to indicate to the driver of the vehicle the degrees of the angle of the grade over which the vehicle may be progressing, and has for its principal object the provision of a device of the character stated which may be mounted on the instrument board of the vehicle or any other suitable support, and comprising angular brackets to be secured to the instrument board between which the casing of the instrument is rotatably mounted, means being provided on the casing to engage the bracket to adjust the casing relatively to a moving member within the casing to permit accurate arrangement of the instrument after installation on the instrument board.

Another object of the invention is the provision of a weighted cylinder within the casing carrying graduations indicating the degrees of angle of grade, weighted arms being also provided on the cylinder to counteract the effects of sudden jolts incident to rough places in the road.

A further object of the invention is the provision of improved means for journaling the graduated cylinder within the casing comprising circular trunnions on the cylinder and bearings for the trunnions that are polygonal in cross section to reduce to the minimum friction between the trunnions and the bearings.

The invention will be described in detail hereinafter and will be found illustrated in the accompanying drawings, in which—

Figure 1 is a front view of the gradometer showing it mounted on an instrument board shown fragmentally, Figure 2 is a transverse sectional view on a plane indicated by the line 2—2 of Figure 1, Figure 3 is a side view of the instrument in position, Figures 4 and 5 are opposite side views of the cylinder, Figure 6, a transverse sectional view of one of the cylinder bearings, and Figure 7 is a longitudinal sectional view of one of the bearings.

In the drawings similar reference characters will be used to designate corresponding parts throughout the several views.

The gradometer comprises a cylindrical casing 1 that comprises two telescoping sections 2 and 3 respectively, the walls of the sections 2 and 3 being cut away as shown at 4 to form a sight opening, a panel of transparent material such as glass, celluloid, mica or the like being mounted in the opening, said panel being designated 5. The side walls of the casing 1 have tubular bearings 6 secured therein that are rotatably mounted in angular brackets 7 that are adapted to be secured to an instrument board A as indicated in Figure 1, to mount the instrument thereon.

Mounted for rotation relatively to the casing 1 is a cylinder 8 comprising a circular web 9 and a peripheral rim 10, this cylinder being mounted for rotation in the casing 1 by means of trunnions 11 extending on each side of the circular web 9 and having circular bearing portions 12 that bear in polygonal bearings 13 in the tubular bearings 6, this structure reducing to a minimum the friction between the trunnion bearings 12 and the polygonal bearings 13.

The peripheral rim 10 is graduated to designate the degrees of a circle from one point thereon indicated zero and extending around the rim in both directions therefrom. The cylinder is weighted on one side of the partition or web 9 as shown at 14, said weight being adapted to maintain the cylinder in a fixed position by gravity in whatever position the enclosing casing may assume because of the inclination of the grade on which the vehicle may be resting or progressing. On the opposite side of the partition or web 9 and on the upper portion thereof from the weight 14 are weighted arms 15, one being mounted on each side of the center of gravity of the cylinder as determined by the weight 14. Arranged intermediate of the weighted arms 15 is a stop 16 to limit the swinging of the arms toward one another. The function of the arms 15 is to stabilize the cylinder 8 to counteract the effects of sudden jars or shocks to the motor vehicle caused by striking obstructions in the road over which it may be progressing. Arranged in the sight opening 4 is a pointer 17 from which the degree of the grade will be indicated and to accurately set the instrument means are provided for doing this, comprising a threaded pin on the outer side of casing 1 and a thumb nut engaging said pin that is adapted to clamp the flange of the angular bracket on the same side of the casing, said threaded pin being indicated 18, the thumb nut at 19, while the flange of the bracket which is concentric with the tubular bearing 6 is designated 20.

Regarding the stabilization of the cylinder by the arms 15, hereinbefore referred to, it will be apparent that the shocks or jars that will disturb the position of the cylinder 8, will be those fore or aft of the vehicle, or in the direction of rotation of the cylinder. Assuming that the jar is forwardly, caused for instance by one or both of the front wheels dropping into a hole in the road, the tendency of the weight 14 will be to swing the lower side of the cylinder towards the front of the vehicle. At the same time, however, the arm 15 on the front side of the stop 16 will be swung forwardly on its pivot and the effort of said arm to resume its normal position, in addition to the weight of the other arm 15, it will counteract the tendency of the weight 14 to rotate the cylinder and the cylinder will remain practically in equilibrium.

In operation the device is mounted on the vehicle by means of the brackets 7. With the vehicle standing on a level surface, casing 1 is set after loosening nut 19 so that pointer 17 is in line with graduation "zero" on the cylinder and the casing then fixed by tightening nut 19 against flange 20. When the device has been so fixed it will be obvious that the device will thereafter indicate the angle of grades on which the vehicle may be standing or proceeding by the graduations on the rotatable cylinder in their relationship with pointer 17.

What is claimed is:—

1. A gradometer, comprising a casing adapted to be mounted on a vehicle and having a slight opening therein, a cylinder in the casing and weighted to hold it in a fixed position by gravity, said cylinder having graduations visible through the sight opening, and weighted members pivotally mounted on said cylinder on opposite sides of the center of gravity thereof to counteract the effect of shocks on the cylinder.

2. A gradometer, comprising a casing adapted to be mounted on a vehicle and having a sight opening therein, a graduated cylinder in the casing and weighted to hold it in a fixed position by gravity, said casing and cylinder being relatively rotatable, weighted members pivotally mounted on the cylinder on opposite sides of the center of gravity thereof to counteract the effect of shocks on the cylinder, and a stop on the cylinder and arranged between the weighted members to limit their movement toward each other.

3. A gradometer, comprising a casing, brackets adapted to mount the casing on a vehicle, one of said brackets having a semicircular flange, means on said casing engaging said flange to hold the casing in a fixed position relatively to the brackets, a weighted cylinder in said casing, said casing and cylinder being relatively rotatable, weighted arms pivotally mounted on the cylinder on opposite sides of the center of gravity thereof, and a stop on the cylinder and arranged between the arms to limit their movement towards each other.

In testimony whereof I affix my signature.

SAMUEL E. MORRISON.